(12) United States Patent
Kim et al.

(10) Patent No.: US 8,169,120 B2
(45) Date of Patent: May 1, 2012

(54) STATOR FOR AC MOTOR

(75) Inventors: Jong Gun Kim, Gwangju (KR); Young Gyun Shin, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 280 days.

(21) Appl. No.: 12/697,432

(22) Filed: Feb. 1, 2010

(65) Prior Publication Data
US 2010/0207482 A1 Aug. 19, 2010

(30) Foreign Application Priority Data
Feb. 13, 2009 (KR) .................. 10-2009-0012109

(51) Int. Cl.
*H02K 1/06* (2006.01)
(52) U.S. Cl. ........... 310/216.008; 310/216.007; 310/215
(58) Field of Classification Search .................. 310/215, 310/216.007–216.008, 216.004
See application file for complete search history.

(56) References Cited

U.S. PATENT DOCUMENTS

| | | | | |
|---|---|---|---|---|
| 4,015,154 A | * | 3/1977 | Tanaka et al. .................. | 310/43 |
| 5,191,698 A | * | 3/1993 | Sumi et al. ..................... | 29/596 |
| 2001/0017500 A1 | * | 8/2001 | Hirama et al. ................. | 310/217 |
| 2005/0189838 A1 | * | 9/2005 | Lee ................................. | 310/217 |
| 2005/0194859 A1 | * | 9/2005 | Lee ................................. | 310/216 |
| 2005/0194860 A1 | * | 9/2005 | Lee ................................. | 310/217 |
| 2010/0264757 A1 | * | 10/2010 | Asou et al. ...................... | 310/43 |

FOREIGN PATENT DOCUMENTS
KR   2000-0022945 A   4/2000

* cited by examiner

*Primary Examiner* — Thanh Lam
(74) *Attorney, Agent, or Firm* — Ohlandt, Greeley, Ruggiero & Perle, L.L.P.

(57) ABSTRACT

A stator of an alternating current (AC) motor is disclosed. The stator includes a stator core having a divided structure including an outer stator core fitted around the inner stator core while being connected to an inner circumference of the inner stator core. The inner stator core has a rotor insertion hole formed at the inner circumference of the inner stator core and a plurality of tooth members arranged in a circumferential direction at an outer circumference of the inner stator core. Since the coils are wound directly on the tooth members through intervals between the neighboring tooth members at the outer circumference of the inner stator core, manufacturing of the stator is facilitated. In addition, since insertion of the coils into the slots is not performed through gaps formed on an inner side of the inner stator core where the rotor insertion hole is formed, the gaps may be minimized. As a result, the performance of the AC motor is improved.

4 Claims, 7 Drawing Sheets

STATOR FOR AC MOTOR

CROSS-REFERENCE TO RELATED APPLICATION(S)

This application claims the benefit of Korean Patent Application No. 2009-0012109, filed on Feb. 13, 2009 in the Korean Intellectual Property Office, the disclosure of which is incorporated herein by reference.

BACKGROUND

1. Field

Embodiments of the present disclosure relate to the structure of a stator for an alternating current (AC) motor, which is capable of improving the performance of the AC motor and also improving the manufacturing efficiency thereof.

2. Description of the Related Art

An alternating current (AC) motor is relatively inexpensive and has a long mechanical life, and therefore has been employed in various fields, for example, as a driving unit for a compressor of a freezing cycle in a refrigerator or an air-conditioner.

The AC motor includes a stator and a rotor. Upon application of electric power to the stator, the rotor is rotated by electromagnetic interaction between the stator and the rotor, thereby converting electric energy into mechanical energy.

The stator is constituted by a stator core, and a coil mounted to the stator core. FIG. 1 is a plan view showing a conventional stator core.

As shown in FIG. 1, the stator core 1 of the AC motor is structured by a plurality of silicon steel plates 2 all having the same ring shape while being stacked in a plurality of layers along the length of the stator core 1.

The stator core 1 includes a rotor receiving hole 1a centrally formed through the stator core 1 to receive a rotor, and a plurality of slots 1b arranged around the rotor receiving hole 1a to receive coils (not shown), respectively. A tooth member 1c is formed in a radial direction between the respective neighboring slots 1b so that the coil is wound on each tooth member 1c and thereby forms a magnetic path. The coil is inserted in the slot 1b through a gap 1d formed on an inner circumference between the respective neighboring tooth members 1c in a direction from the rotor receiving hole 1a.

As a width of the gap 1d is decreased, core loss and excitation current are reduced, thereby improving the performance of the AC motor. However, according to the conventional structure of the stator core 1 as described above, the coil is inserted in the slot 1b through the gap 1d formed between the tooth members 1c. Therefore, the width of the gap 1d needs to be sufficient for insertion the coil, that is, about at least 1.70 mm in consideration of thickness of the coil.

In order to construct the stator of the conventional AC motor, first, a plurality of the silicon steel plates 2 are connected in a stacked manner, thereby forming the stator core 1. In a state where an insulator (not shown) is mounted at an inner wall of each of the slots 1b, the coil is inserted in the slot 1b.

When the coil is inserted in the slot 1b, the coil cannot be wound directly on the tooth member 1c because the width of the gap 1d is too narrow. Therefore, the coil is rolled into a ring shape in advance at the outside of the stator core 1 and then is inserted in the slot 1b through the gap 1d. According to such a conventional method, installation of the coil is complicated. As a result, manufacturing of the stator becomes inconvenient.

In order to solve such inconvenience, the gap 1d may be widened so that the coil is directly wound on the stator core 1. However, core loss and excitation current will be increased in this case, thereby deteriorating the performance of the AC motor.

Furthermore, after the coils are mounted at the stator core 1, a coil trimming process is additionally performed in a manner that the coils drawn along the length of the stator core 1 and exposed out of the slot 1b are tied up using a fixing string, thus completing manufacturing of the conventional AC motor stator. As described so far, manufacture of the conventional AC motor stator has several inconveniences, for example, the coil trimming process additionally required after mounting of the coil.

SUMMARY

Therefore, it is an aspect of the present disclosure to provide a stator for an alternating current (AC) motor, capable of being more conveniently manufactured and improving the performance of the AC motor.

Additional aspects of the disclosure will be set forth in part in the description which follows and, in part, will be obvious from the description, or may be learned by practice of the disclosure.

In accordance with an aspect of the present disclosure, a stator for an AC motor includes a stator core having a divided structure comprising an inner stator core and an outer stator core fitted around the inner stator core while being connected to an inner circumference of the inner stator core, the inner stator core having a rotor insertion hole formed at the inner circumference of the inner stator core and a plurality of teeth members arranged in a circumferential direction at an outer circumference of the inner stator core to wind coils thereon, wherein the inner stator core comprises a plurality of layer units stacked in a lengthwise direction while being coupled together, wherein the plurality of layer units comprise ring-shaped integrated layer units each having a plurality of integrally-connected teeth pieces, and separate layer units each having a plurality of separate teeth pieces, the integrally-connected teeth pieces of the integrated layer units and the separate teeth pieces of the separate layer units forming the plurality of teeth members, and wherein the integrated layer units are disposed at opposite longitudinal ends of the inner stator core, and the separate layer units are disposed between the integrated layer units.

The AC motor stator may further include a gap defined between circumferentially-neighboring ones of the teeth members, wherein the gap is twice an air gap defined between a rotor and the rotor insertion hole.

One or two of the integrated layer units may be disposed at each longitudinal end of the inner stator core.

The AC motor stator may further include an insulator connected to the inner stator core so as to insulate the coils from the stator core. The insulator may include guards to support exposed parts of the coils to the outer stator core. The guards may be formed at positions of the insulator corresponding to the inner and outer circumferences of the inner stator core, to extend in a lengthwise direction of the inner stator core.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
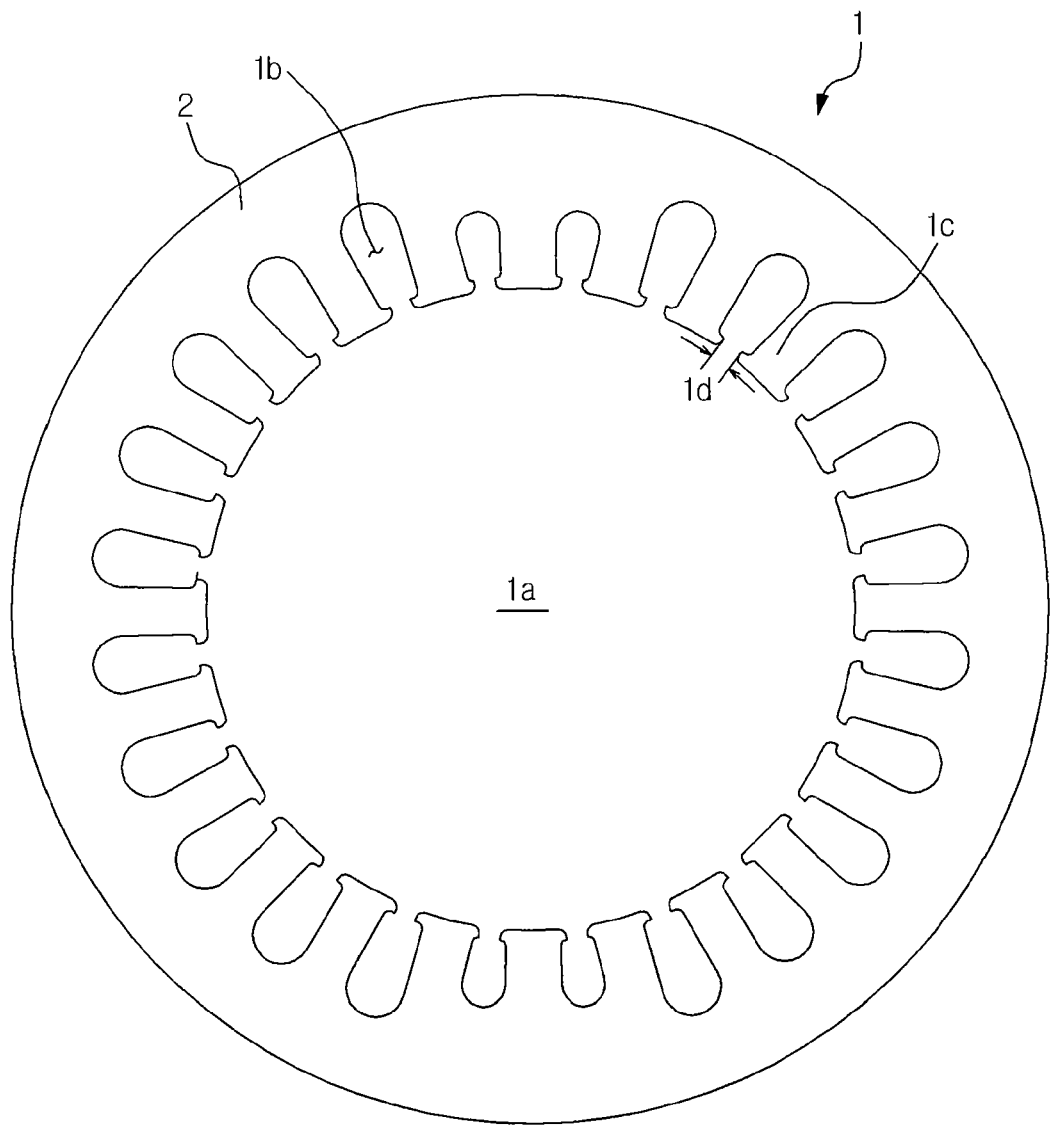
FIG. 1 is a plan view showing the structure of a stator core of a conventional alternating current (AC) motor stator.
Figure 2:
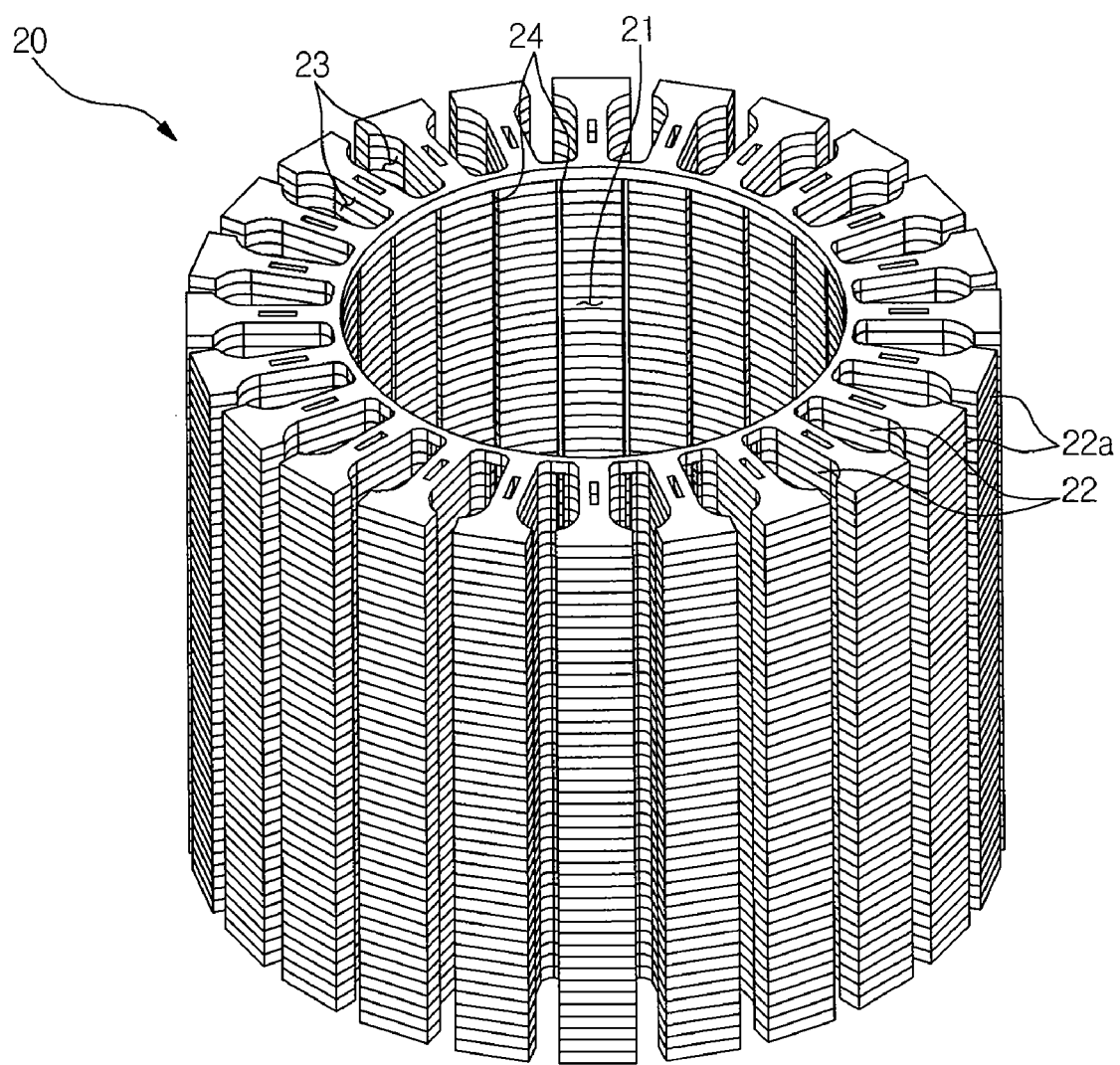
FIG. 2 is a perspective view showing the structure of an inner stator core of an AC motor stator according to an embodiment of the present disclosure.
Figure 3:
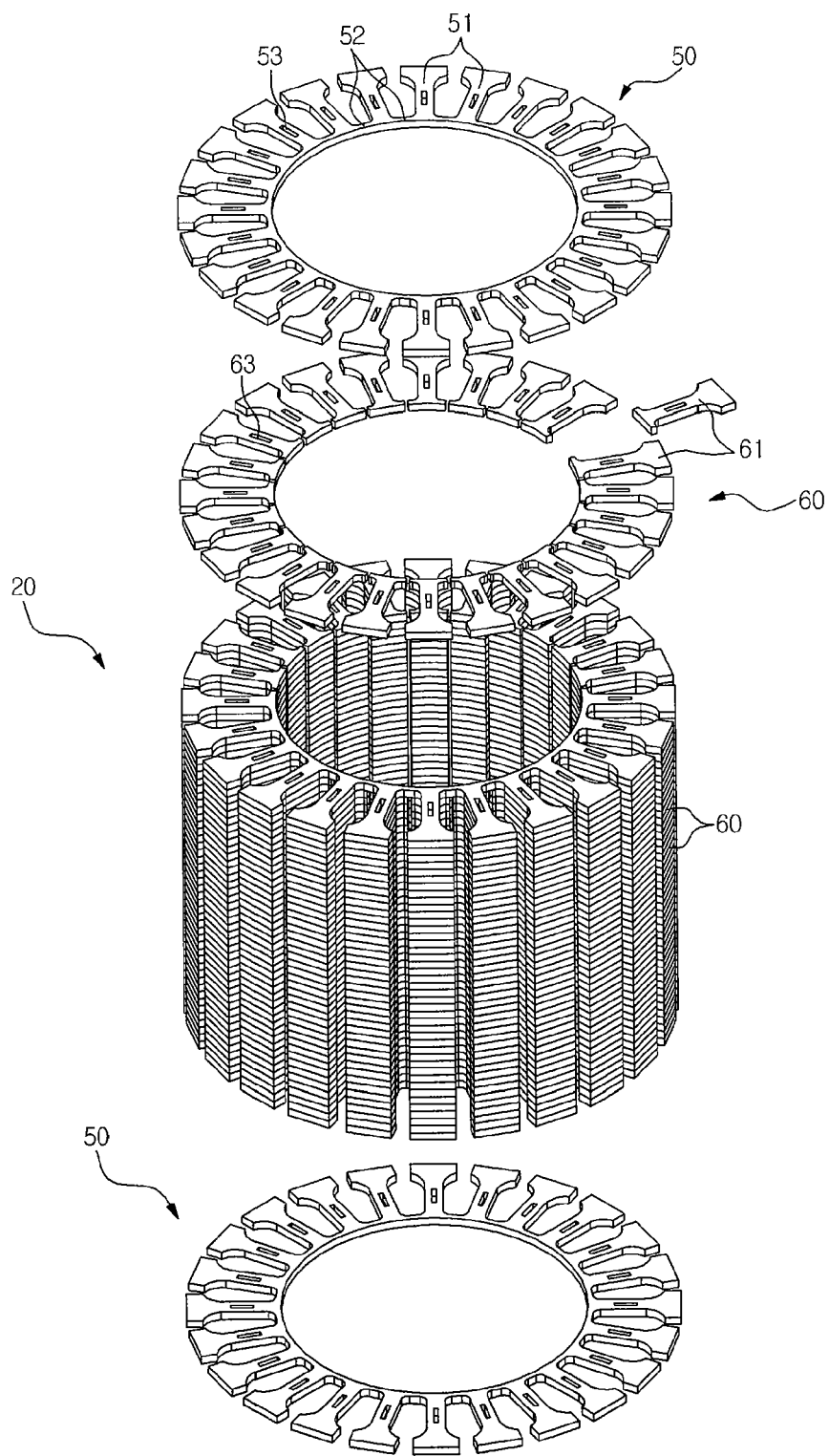
FIG. 3 is an exploded perspective view of the inner stator core of the AC motor stator according to the embodiment of the present disclosure.
Figure 4:
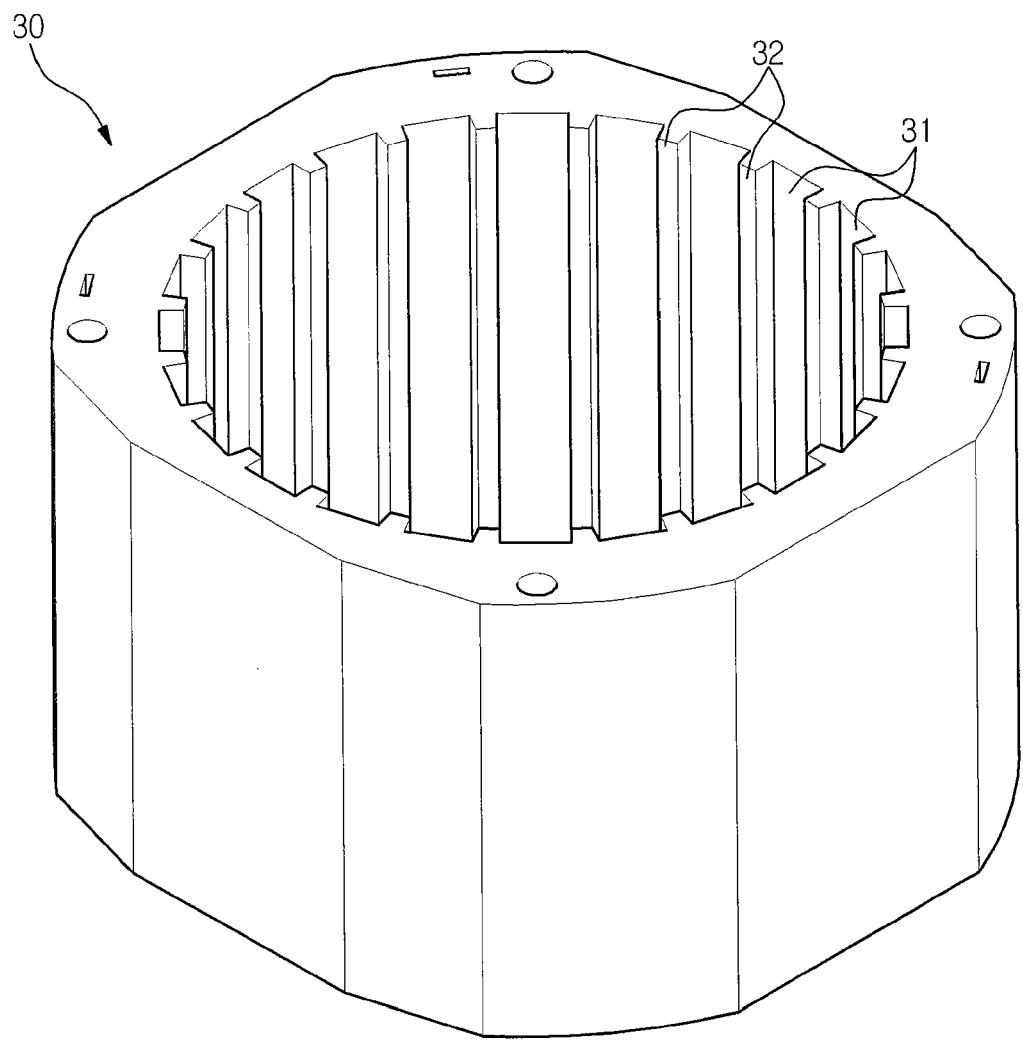
FIG. 4 is a perspective view showing the structure of an outer stator core of the AC motor stator.

Reference will now be made in detail to the embodiment of the present disclosure, examples of which are illustrated in the accompanying drawings, wherein like reference numerals refer to like elements throughout.

As shown in FIGS. 2 to 4 and FIG. 7, a stator of an alternating current (AC) motor according to the embodiment of the present disclosure includes a stator core 10 and coils 40 mounted to the stator core 10.

The stator core 10 has a divided structure constituted by an inner stator core 20 and an outer stator core 30. The inner stator core 20 includes a rotor insertion hole 21 formed at an inner circumference of the inner stator core 20 to receive a rotor, and a plurality of tooth members 22 circumferentially arranged at an outer circumference of the inner stator core 20 to wind coils 40 around the tooth members 22. The outer stator core 30 has a hollow cylindrical shape so that the inner stator core 20 is fitted in an inner circumference of the outer stator core 30. In the inner stator core 20, a space defined between neighboring ones of the tooth members 22 forms a slot 23 to mount each coil 40.

To achieve connection between the inner stator core 20 and the outer stator core 30, connection grooves 31 are formed on an inner circumference of the outer stator core 30 for force-fit connection with connection parts 22a formed at respective outer ends of the tooth members 22 of the inner stator core 20. A sealing part 32 is formed between neighboring ones of the connection grooves 31 of the outer stator core 30 in order to seal a gap defined between neighboring ones of the connection parts 22a when the inner and the outer stator cores 20 and 30 are interconnected.

Therefore, the interval between the neighboring connection parts 22a of the inner stator core 20 may be designed to be wide, irrespective of core loss or excitation current. As a result, the coils 40 may be wound directly on the tooth members 22 such that they are inserted into the slots 23 around the connection parts 22a, before the inner stator core 20 is connected to the outer stator core 30. Accordingly, winding of the coils 40 may be more rapidly performed.

The inner stator core 20 is formed by stacking a plurality of layer units 50 and 60 in a longitudinal direction. Here, the layer units 50 are disposed at opposite longitudinal ends of the inner stator core 20, whereas the layer units 60 are disposed between the layer units 50. The layer units 50 and the layer units 50 have different forms from each other, so as to define a gap 24 having a minimal size between the neighboring tooth members 22 at the side of the inner circumference of the inner stator core 20 defining the rotor insertion hole 21.

More particularly, the layer units 50 and 60 constituting the inner stator core 20 include integrated layer units 50 having an integrated ring shape in which a plurality of teeth 51 are integrally connected, and separate layer units 60 in which a plurality of separate teeth 61 are separately and circularly arranged. The teeth 51 and 61 of the integrated and separate layer units 50 and 60 form the tooth members 22.

Each of the integrated layer units 50 includes the teeth 51, which form the tooth members 22, and connection parts 52 each disposed between neighboring ones of the teeth 51, to integrally connect the teeth 51. The integrated layer units 50 are disposed at opposite longitudinal ends of the inner stator core 20. Each of the separate layer units 60 includes the teeth 61, which are circularly arranged. The separate layer units 60 are disposed between the opposite integrated layer units 50 in such a manner that the teeth 61 correspond to the teeth 51. The teeth 61 forming the separate layer units 60, and the integrated layer units 50 may be manufactured by punching a silicon steel plate according to their shapes. The layer units 50 and 60 are stacked and interconnected through caulking.

Reference numerals 53 and 63 denote caulking holes for caulking. However, not limited to the caulking, the layer units 50 and 60 may be interconnected through welding or bolt-connection.

Thus, in the inner stator core 20 according to the above embodiment, the gap 24 between the neighboring tooth members 22 at the side of the rotor insertion hole 21 is defined by an interval between the neighboring teeth 61 of the separate layer units 60 stacked between the opposite longitudinal ends of the inner stator core 20. The separate layer units 60 are combined with the annular integrated layer units 50 into an integral body, accordingly constructing the inner stator core 20. Therefore, mounting of the coil 40 in the slot 23 may be performed through the intervals between the neighboring connection parts 22a forming the outer circumference of the inner stator core 20. That is, the gap 24 between the tooth members 22 may be designed to have a minimal width, without taking into consideration insertion of the coil 40. As a consequence, the performance of the AC motor may be improved compared to the conventional art.

The width of the gap 24 may be twice an air gap defined between a rotor (not shown) and the rotor insertion hole 21, in order to maximize the performance of the AC motor. Also, the gap 24 may be formed merely by adjusting the interval between the teeth 61 of the separate layer unit 60, without a dedicated process. For example, when the air gap formed between the rotor (not shown) and the rotor insertion hole 21 is about 0.3 mm, the width of the gap 24 may be about 0.6 mm.

Meanwhile, the integrated layer units 50 having no gap along the inner circumference become leakage parts where a magnetic path is not formed. In this regard, the number of the integrated layer units 50 at each longitudinal end of the inner stator core 20 may be minimized to be, for example, one or two. In the illustrated embodiment, a single integrated layer unit 50 is provided at each longitudinal end of the inner stator core 20.

Figure 5:
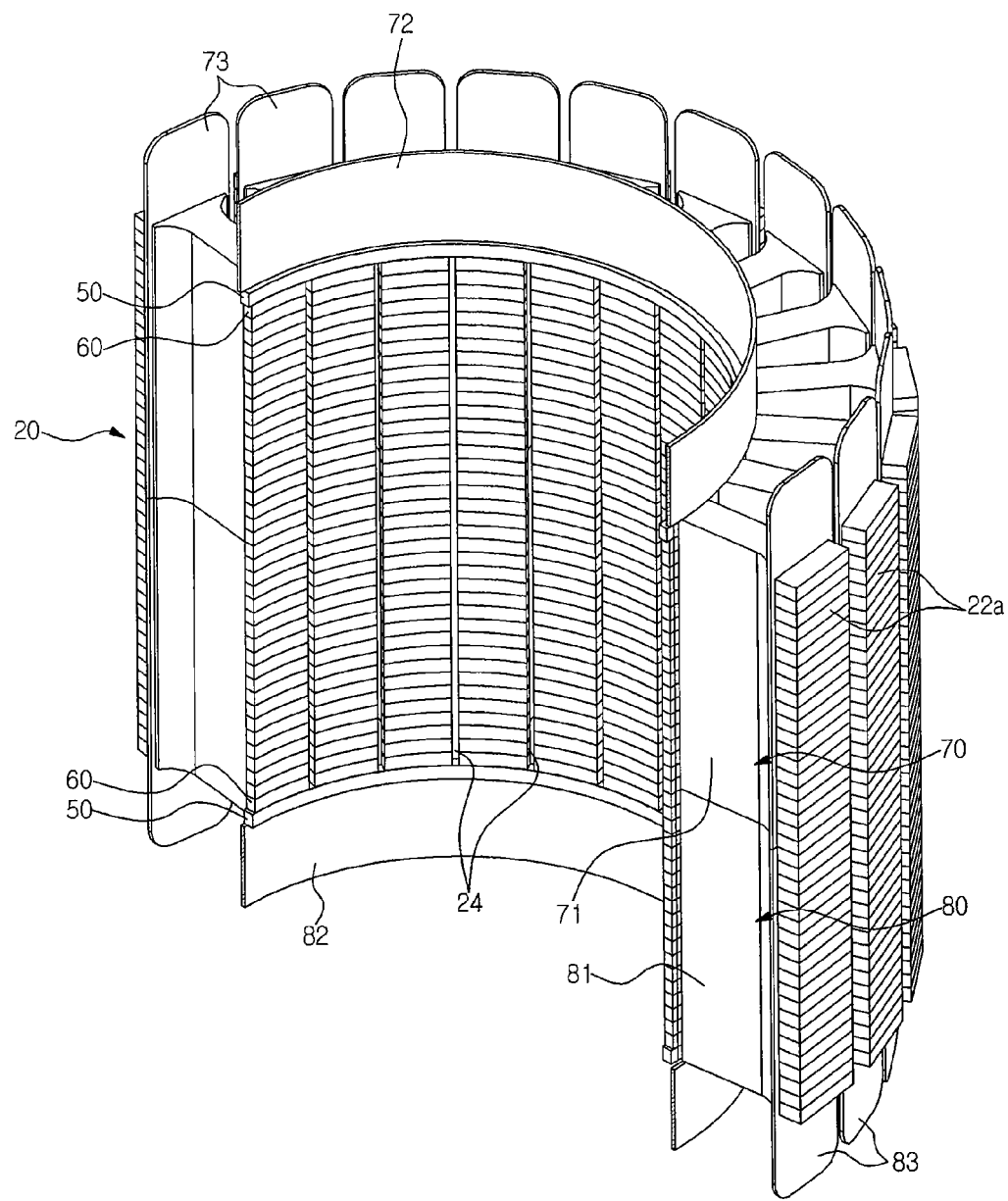
FIG. 5 is a partially cutaway perspective view showing the structure of the inner stator core of the AC motor stator, with an insulator mounted thereto.
Figure 6:
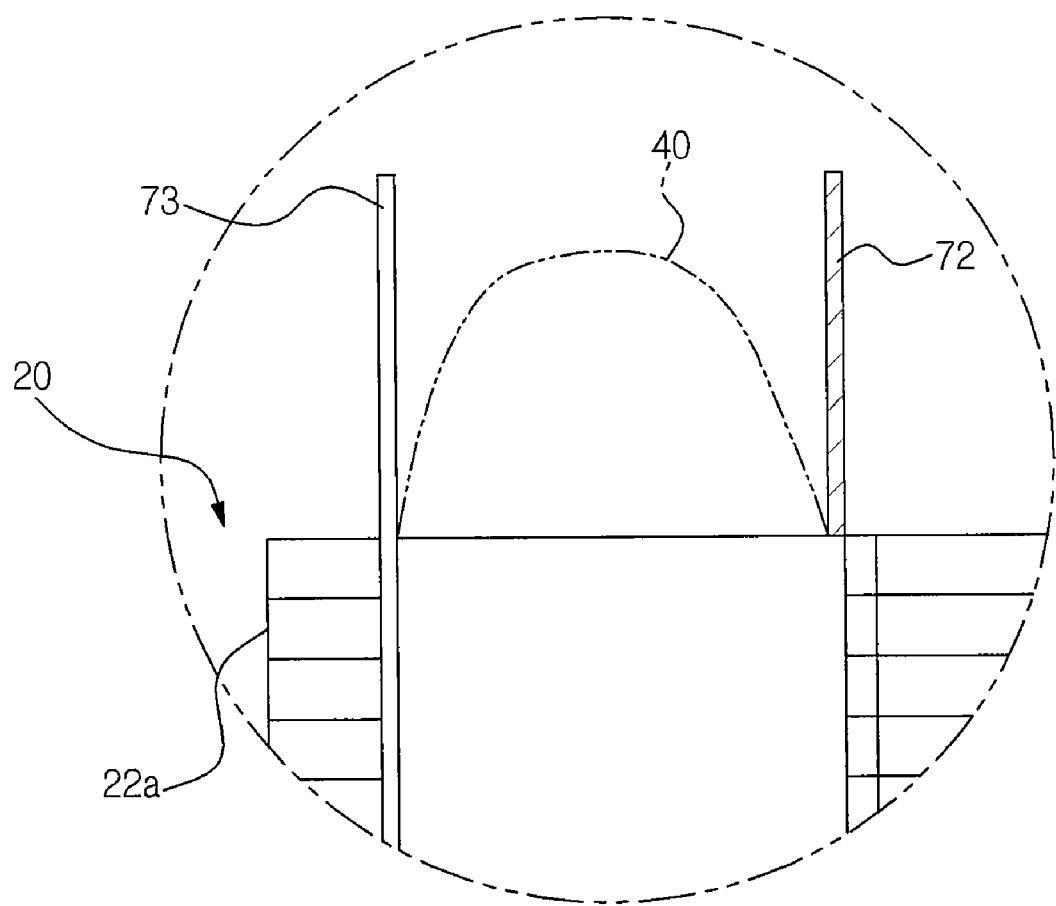
FIG. 6 is a sectional view showing the structure of main parts of the inner stator core of the AC motor stator, with the insulator mounted thereto.
Figure 7:
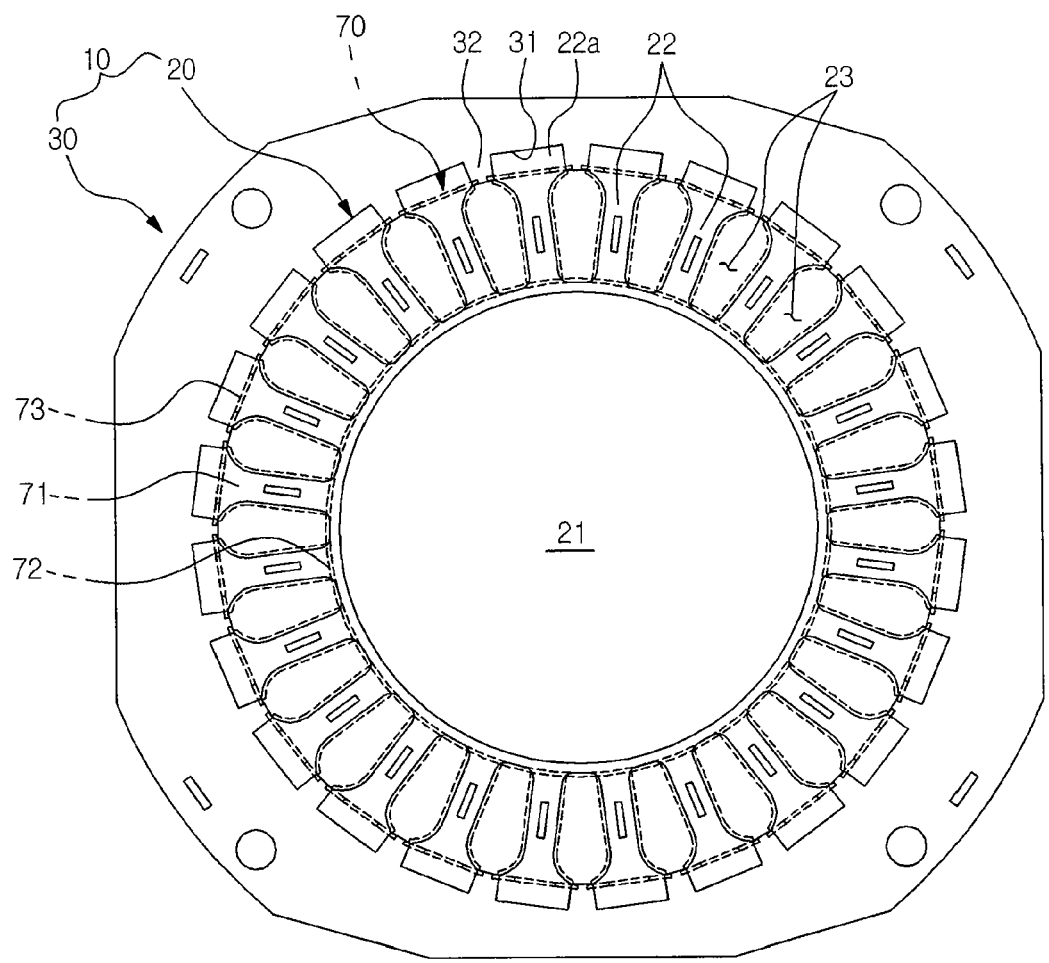
FIG. 7 is a top view showing the inner stator core and outer stator core of the AC motor stator according to the embodiment of the present disclosure.

Referring to FIG. 5 and FIG. 6, the stator of this embodiment further includes first and second insulators 70 and 80 connected to the stator core 10 so as to insulate the coils 40 from the stator core 10. For more convenient manufacturing of the stator, the first insulator 70 includes guards 72 and 73, and the second insulator 80 includes guards 82 and 83, respectively. The guards 72, 73, 82, and 83 function to support the coils 40, and are connected to the inner stator core 20 before the inner stator core 20 is connected with the outer stator core 30.

The first insulator 70 is mounted to one end of the inner stator core 20, whereas the second insulator 80 is mounted to the other end of the inner stator core 20. The first and the second insulators 70 and 80 include pluralities of first and second insulating members 71 and 81, respectively. The first and second insulating members 71 and 81 are arranged in a circumferential direction to surround the tooth members 22, except for the outer side where the connection parts 22a are formed and the inner side where the rotor insertion hole 21 is formed.

The first and second insulating members 71 and 81 of the first and second insulators 70 and 80 surround the tooth members 22 at respective longitudinal half portions of the inner stator core 20. In a state where the inner stator core 20 is completely coupled, corresponding ones of the first and the second insulating members 71 and 81 are in contact with each other at facing ends thereof so that the inner walls of the slot 23 and the coil 40 are completely insulated from each other.

The guards 72, 73, 82 and 83 are formed at positions of the insulators 70 and 80, corresponding to the inner and outer circumferences of the inner stator core 20, while extending to a predetermined length in a lengthwise direction of the inner stator core 20. Each of the inner guards 72 and 82 has a single annular structure. The inner guards 72 and 82 are arranged at the upper and lower inner circumferences of the inner stator core 20, respectively. The outer guards 73 and 83 are disposed in plural at the upper and lower outer circumferences of the inner stator core 20, respectively, such that they correspond to the first and the second insulating members 71 and 81 one by one.

Accordingly, as shown in FIG. 6, when the coils 40 are wound directly on the tooth members 22 of the inner stator core 20 to which the first and the second insulating members 70 and 80 are mounted, parts of the coils 40 exposed outwardly of the slots 23 in the lengthwise direction of the inner stator core 20 may be stably supported by the inner guards 72 and 82 and the outer guards 73 and 83. That is, it is unnecessary to dedicatedly trim the coils 40 wound on the inner stator core 20. Thus, the stator may be manufactured more efficiently and rapidly.

After the insulators 70 and 80 and the coils 40 are mounted to the inner stator core 20, the inner stator core 20 is connected to the outer stator core 30 by force-fitting the connection parts 22a of the inner stator core 20 to the connection grooves 31 of the outer stator core 30. Thus, assembly of the AC motor stator is completed.

As is apparent from the above description, in the stator of the AC motor according to the embodiment of the present disclosure, the stator core has a divided structure including and an outer stator core fitted around the inner stator core while being connected to an inner circumference of the inner stator core. The inner stator core has a rotor insertion hole formed at the inner circumference of the inner stator core and a plurality of tooth members arranged in a circumferential direction at an outer circumference of the inner stator core.

According to this structure, a coil may be wound directly on each tooth member through intervals between the neighboring tooth members at the outer circumference of the inner stator core. Therefore, manufacturing of the stator is facilitated.

Furthermore, since insertion of the coils into the slots is not performed through gaps formed at the inner side of the inner stator core where the rotor insertion hole is formed, the gaps may have a minimal size. As a result, the performance of the AC motor is improved.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A stator for an alternating current (AC) motor, comprising:
   a stator core having a divided structure comprising an inner stator core and an outer stator core fitted around the inner stator core while being connected to an inner circumference of the inner stator core, the inner stator core having a rotor insertion hole formed at the inner circumference of the inner stator core and a plurality of tooth members arranged in a circumferential direction at an outer circumference of the inner stator core to wind coils thereon;
   wherein the inner stator core comprises a plurality of layer units stacked in a lengthwise direction while being coupled together;
   wherein the plurality of layer units comprise ring-shaped integrated layer units each having a plurality of integrally-connected teeth, and separate layer units each having a plurality of separate teeth, the integrally-connected teeth of the integrated layer units and the separate teeth of the separate layer units forming the plurality of tooth members; and
   wherein the integrated layer units are disposed at opposite longitudinal ends of the inner stator core, and the separate layer units are disposed between the integrated layer units.

2. The AC motor stator according to claim 1, further comprising a gap defined between circumferentially-neighboring ones of the tooth members, wherein the gap is twice an air gap defined between a rotor and the rotor insertion hole.

3. The AC motor stator according to claim 1, wherein one or two of the integrated layer units are disposed at each longitudinal end of the inner stator core.

4. The AC motor stator according to claim 1, further comprising an insulator connected to the inner stator core so as to insulate the coils from the stator core,
   wherein the insulator includes guards to support exposed parts of the coils to the outer stator core, and
   wherein the guards are formed at positions of the insulator corresponding to the inner and outer circumferences of the inner stator core, to extend in a lengthwise direction of the inner stator core.

* * * * *